United States Patent
Chiang et al.

(10) Patent No.: US 10,077,014 B1
(45) Date of Patent: Sep. 18, 2018

(54) BODY-MOUNTED TIRE BLOCKER ASSEMBLY

(71) Applicant: GM GLOBAL TECHNOLOGY OPERATIONS LLC, Detroit, MI (US)

(72) Inventors: Huai-yang Chiang, Troy, MI (US); Vikas V. Joshi, Rochester Hills, MI (US); Hari Prasada Reddy Lingala, Macomb, MI (US); Warren J. Parsons, Oakland, MI (US); Terry A. Swartzell, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/463,190

(22) Filed: Mar. 20, 2017

(51) Int. Cl.
| | |
|---|---|
| *B60R 19/02* | (2006.01) |
| *B62D 21/15* | (2006.01) |
| *B62D 27/06* | (2006.01) |
| *B62D 25/08* | (2006.01) |
| *B62D 21/02* | (2006.01) |
| *B62D 27/02* | (2006.01) |
| *B62D 25/20* | (2006.01) |
| *B62D 25/04* | (2006.01) |

(52) U.S. Cl.
CPC .............. *B60R 19/02* (2013.01); *B62D 21/02* (2013.01); *B62D 21/152* (2013.01); *B62D 25/04* (2013.01); *B62D 25/082* (2013.01); *B62D 25/2036* (2013.01); *B62D 27/023* (2013.01); *B62D 27/065* (2013.01)

(58) Field of Classification Search
CPC ...... B62D 25/04; B62D 25/2036; B60R 19/02
USPC .................................. 296/209, 187.09, 187.1
See application file for complete search history.

(56) References Cited

U.S. PATENT DOCUMENTS

| | | | | |
|---|---|---|---|---|
| 5,275,436 | A * | 1/1994 | Pomero ................... | B60R 21/00 180/232 |
| 6,364,358 | B1 * | 4/2002 | Miller ..................... | B62D 25/04 280/784 |
| 8,469,442 | B1 * | 6/2013 | Pencak .................. | B62D 25/14 296/187.12 |
| 9,340,230 | B2 * | 5/2016 | Murray .................. | B62D 21/15 |
| 9,469,347 | B1 * | 10/2016 | Schnug .................. | B62D 21/15 |
| 9,821,853 | B2 * | 11/2017 | Torikawa ............. | B62D 25/025 |
| 2013/0161932 | A1 * | 6/2013 | Murray .................. | B62D 21/15 280/784 |
| 2015/0166112 | A1 * | 6/2015 | Chung ................... | B62D 25/08 296/187.1 |

(Continued)

FOREIGN PATENT DOCUMENTS

DE     102012025335     *   6/2004

*Primary Examiner* — Dennis H Pedder
(74) *Attorney, Agent, or Firm* — Quinn IP Law

(57) ABSTRACT

A body-mounted tire blocker assembly can absorb and/or manage energy when a vehicle body assembly is subjected to an external force. This vehicle body assembly may include a vehicle body defining a passenger compartment. The vehicle body further includes a rocker panel defining a first panel end and a second panel end opposite the first panel end. The tire blocker assembly is coupled to the rocker panel and includes a first blocker body and a second blocker body coupled to the first blocker body. The first blocker body is farther from the first panel end than the second blocker body in order to guide a wheel away from the passenger compartment when an external force is applied to the vehicle body.

15 Claims, 7 Drawing Sheets

(56) References Cited

U.S. PATENT DOCUMENTS

2015/0246692 A1* 9/2015 Rangaswamaiah .... B62D 25/04
296/187.1
2016/0194031 A1* 7/2016 Yamamoto ........... B62D 25/025
296/187.1

* cited by examiner

BODY-MOUNTED TIRE BLOCKER ASSEMBLY

TECHNICAL FIELD

The present disclosure relates to a body-mounted tire blocker assembly for managing and/or absorbing energy originating from an external force applied to a vehicle body.

BACKGROUND

Vehicles may sometimes be subjected to external forces. If an external force is exerted on the vehicle, some vehicle components may manage and/or absorb the energy of that external force.

SUMMARY

The present disclosure relates to a body-mounted tire blocker assembly for absorbing/managing energy when a vehicle body assembly is subjected to an external force. This vehicle body assembly may include a vehicle body defining a passenger compartment. The vehicle body further includes a rocker panel defining a first panel end and a second panel end opposite the first panel end. The tire blocker assembly is coupled to the rocker panel and includes a first blocker body and a second blocker body coupled to the first blocker body. The first blocker body is farther from the first panel end than the second blocker body in order to guide a wheel away from the passenger compartment when an external force is applied to the vehicle body.

According to an aspect of the present disclosure, the first blocker body comprises a first material. The second blocker body comprises a second material. The first material has a first yield strength. The second material has a second yield strength. The second yield strength is less than the first yield strength to allow the second blocker body to absorb energy when the external force is applied to the vehicle body.

According to an aspect of the present disclosure, the rocker panel extends along a longitudinal direction. The first blocker body includes a deflecting wall extending along a lateral direction, and the lateral direction is perpendicular to the longitudinal direction.

According to an aspect of the present disclosure, the first blocker body has a first maximum thickness, the second block body has a second maximum thickness, and the first maximum thickness is greater than the second maximum thickness.

According to an aspect of the present disclosure, the rocker panel defines a first panel end and a second panel end opposite the first panel end. The first panel end is spaced apart from the second panel end along the longitudinal direction. The tire blocker assembly is closer to the first panel end than to the second panel end.

According to an aspect of the present disclosure, the vehicle body further comprising a rocker end cap directly coupled to the first panel end, and the tire blocker assembly is directly coupled to the rocker end cap.

According to an aspect of the present disclosure, the first blocker body includes a first flange coupled to the deflecting wall. The first flange is closer to the rocker end cap than to the deflecting wall. The vehicle body assembly further includes at least one fastener extending through the first flange and the rocker end cap.

According to an aspect of the present disclosure, the first blocker body includes a first coupling wall interconnecting the deflecting wall and the first flange.

According to an aspect of the present disclosure, the second blocker body includes an energy-absorbing wall extending along the lateral direction.

According to an aspect of the present disclosure, the second blocker body includes a connecting wall. The connecting wall is closer to the rocker end cap than the energy-absorbing wall. The connecting wall is obliquely angled relative to the energy-absorbing wall.

According to an aspect of the present disclosure, the first blocker body includes a first connecting wall directly interconnecting the deflecting wall and the first flange. The second blocker body includes a second connecting wall directly coupled to the energy-absorbing wall. The second connecting wall is closer to the rocker end cap than the energy-absorbing wall. The second connecting wall is obliquely angled relative to the energy-absorbing wall.

According to an aspect of the present disclosure, the second blocker body includes a second flange. The second connecting wall directly interconnects the energy-absorbing wall and the second flange. The second connecting wall is parallel to the first connecting wall. The deflecting wall is parallel to the energy-absorbing wall.

The present disclosure also relates to a vehicle including a vehicle body assembly as described above.

According to an aspect of the present disclosure, the frame includes frame rail. The vehicle further includes a mount directly coupled to the frame rail.

According to an aspect of the present disclosure, the vehicle further comprising a shield directly coupled to the frame rail. The shield is disposed between the wheel and the mount. The shield partially surrounds the mount in order to prevent the wheel from moving toward the passenger compartment when an external force is applied to the vehicle body.

According to an aspect of the present disclosure, the shield includes a first bar portion and a second bar portion directly connected to the first bar portion. The first bar portion and the second bar portion are obliquely angled relative to each other.

According to an aspect of the present disclosure, the rocker panel extends along a longitudinal direction. The first blocker body includes a deflecting wall extending along a lateral direction. The lateral direction is perpendicular to the longitudinal direction. The deflecting wall is positioned relative to the shield such that the deflecting wall guides the wheel toward the shield when the external force is applied to the vehicle body.

According to an aspect of the present disclosure, the first blocker body comprises a first material. The second blocker body includes a second material. The first material has a first yield strength. The second material has a second yield strength. The second yield strength is less than the first yield strength to allow the second blocker body to absorb energy when the external force is applied to the vehicle body.

According to an aspect of the present disclosure, the rocker panel extends along the longitudinal direction and defines a first panel end and a second panel end opposite the first panel end. The first panel end is spaced from the second panel end along the longitudinal direction. The vehicle body further includes a rocker end cap directly coupled to the first panel end. The tire blocker assembly is directly coupled to the rocker end cap. The tire blocker assembly further includes a fastener extending through the first blocker body, the second blocker body, and the rocker end cap to directly couple the tire blocker assembly to the rocker end cap.

According to an aspect of the present disclosure, the first blocker body has a first maximum thickness. The second block body has a second maximum thickness. The first maximum thickness is greater than the second maximum thickness.

The above features and advantages and other features and advantages of the present teachings are readily apparent from the following detailed description of the best modes for carrying out the teachings when taken in connection with the accompanying drawings.

DETAILED DESCRIPTION

Figure 1:
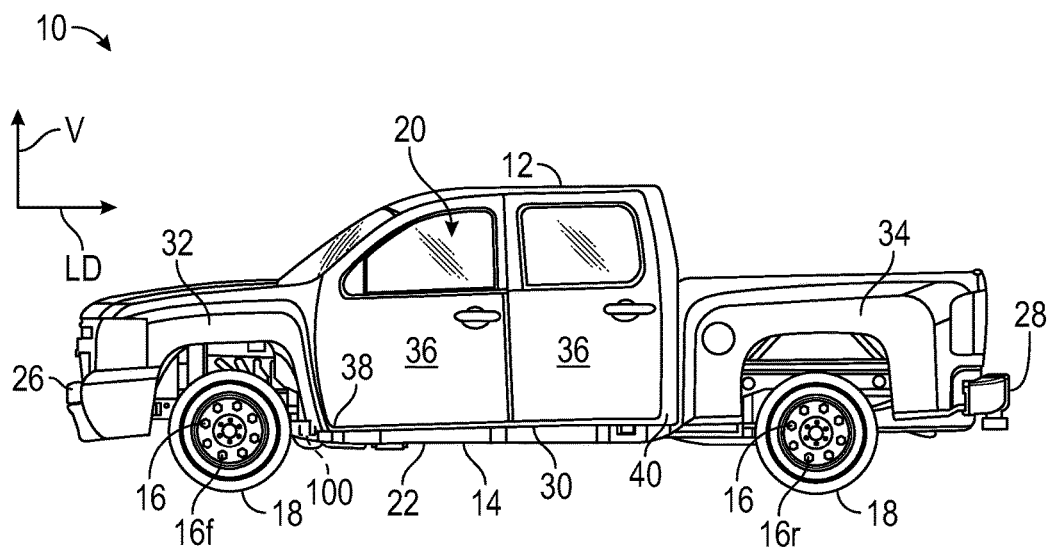
FIG. 1 is a schematic, side view of a vehicle including a body-mounted tire blocker assembly.
Figure 2:
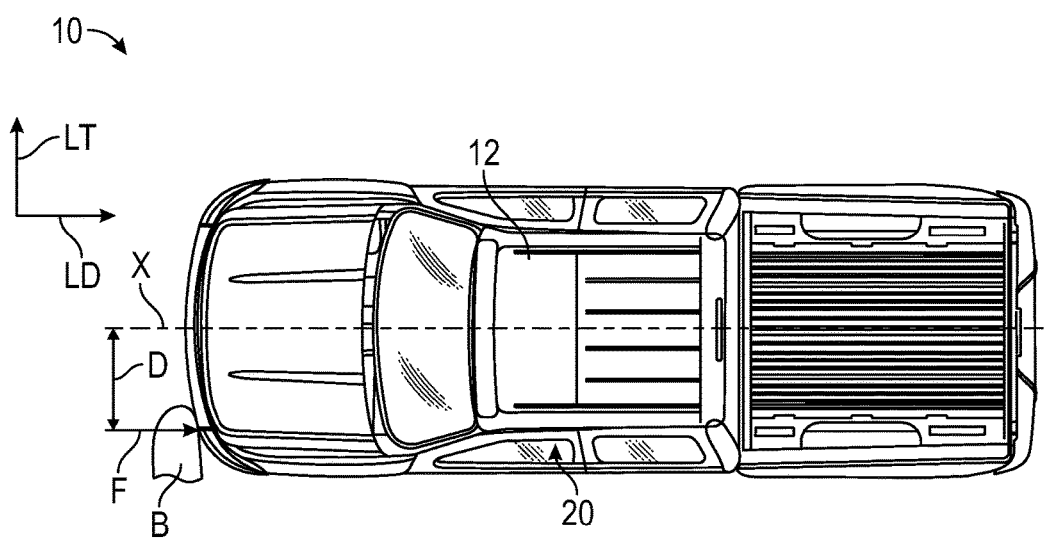
FIG. 2 is a schematic top view of the vehicle shown in FIG. 1.
Figure 3:
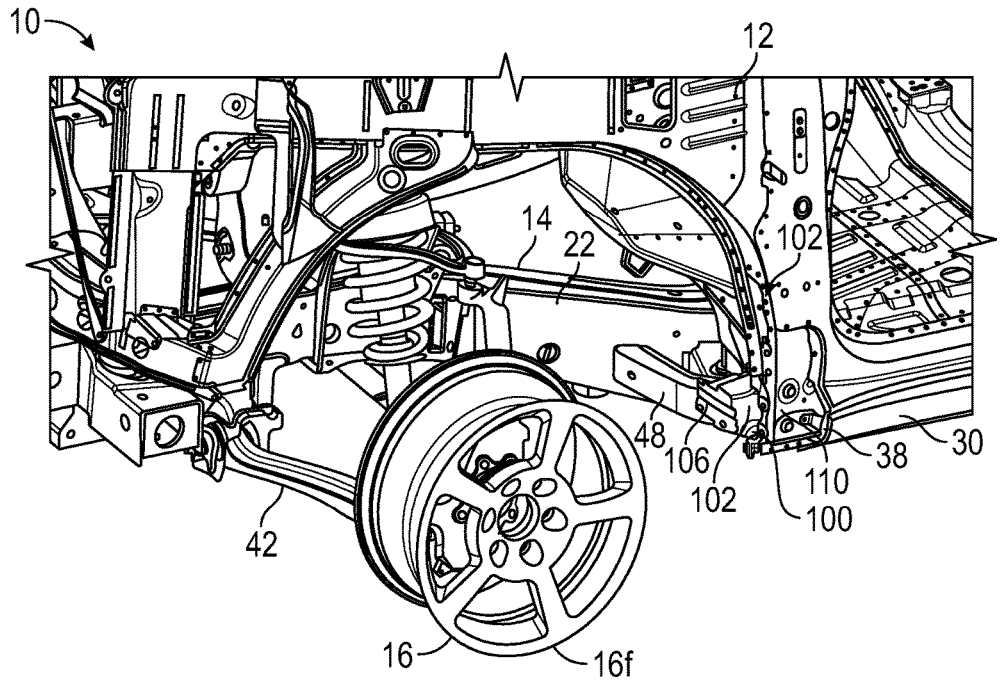
FIG. 3 is a schematic, fragmentary, perspective view of the vehicle shown in FIG. 1, depicting a frame, a vehicle body, a wheel, and the body-mounted tire blocker assembly.
Figure 4:
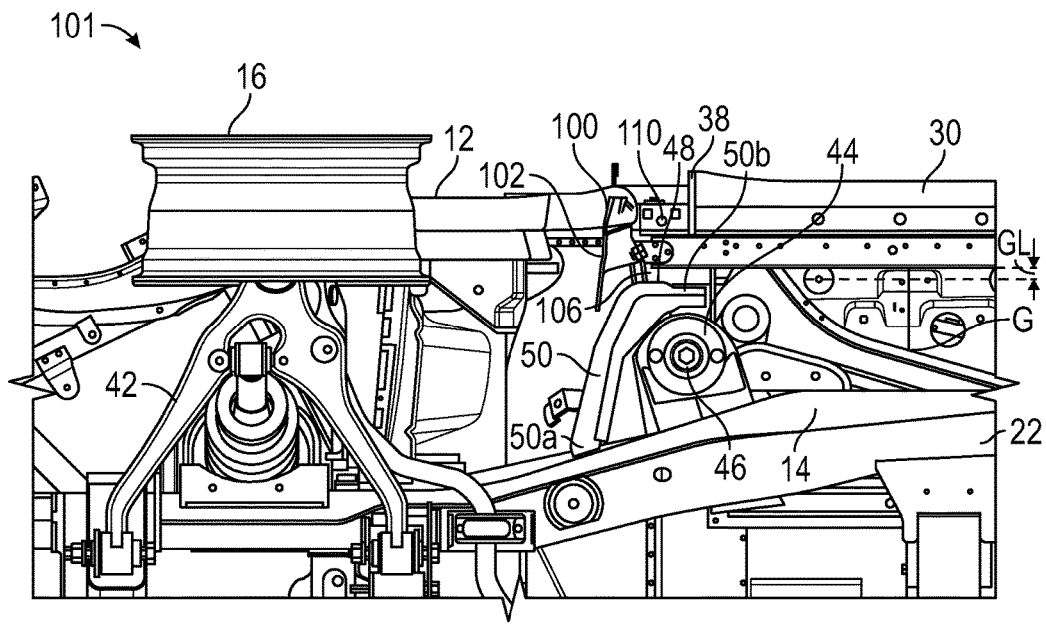
FIG. 4 is a schematic, fragmentary, bottom view of the vehicle shown in FIG. 1, depicting the wheel
Figure 5:
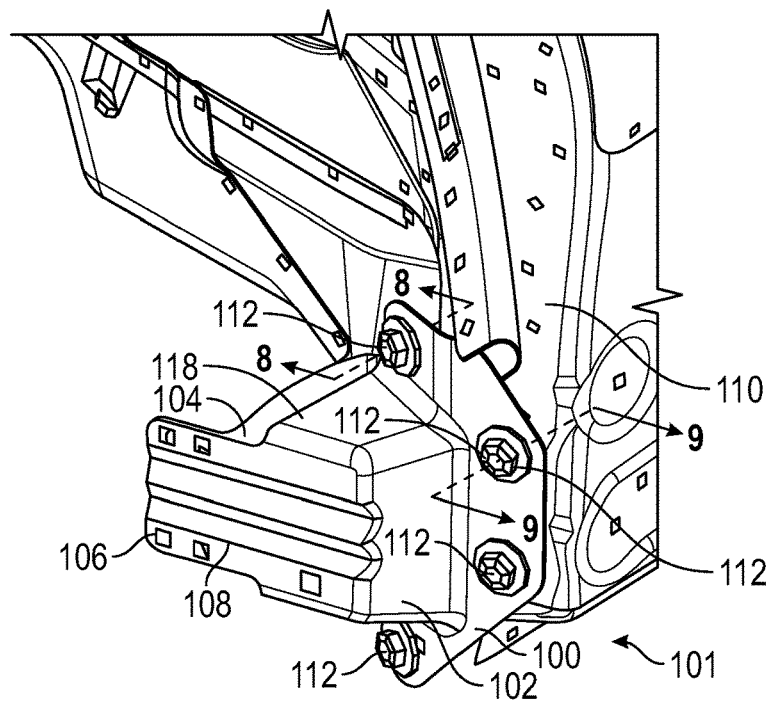
FIG. 5 is a schematic, fragmentary, outer perspective view of the body-mounted tire blocker assembly attached to the vehicle body shown in FIG. 3.
Figure 6:
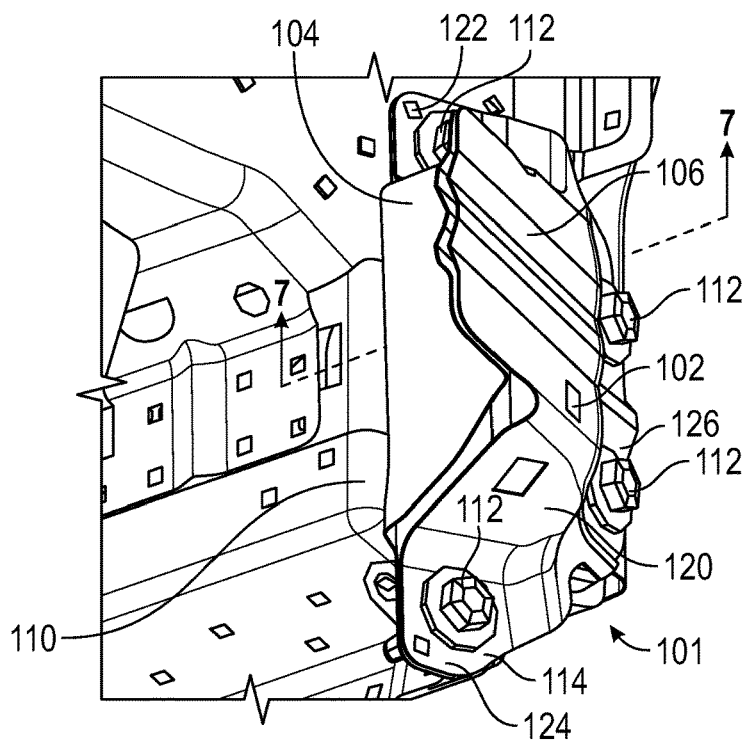
FIG. 6 is a schematic, fragmentary, inner perspective view of the body-mounted tire blocker assembly attached to the vehicle body shown in FIG. 3, wherein the body-mounted tire blocker assembly includes a first body blocker and a second body blocker coupled to the first body blocker.
Figure 7:
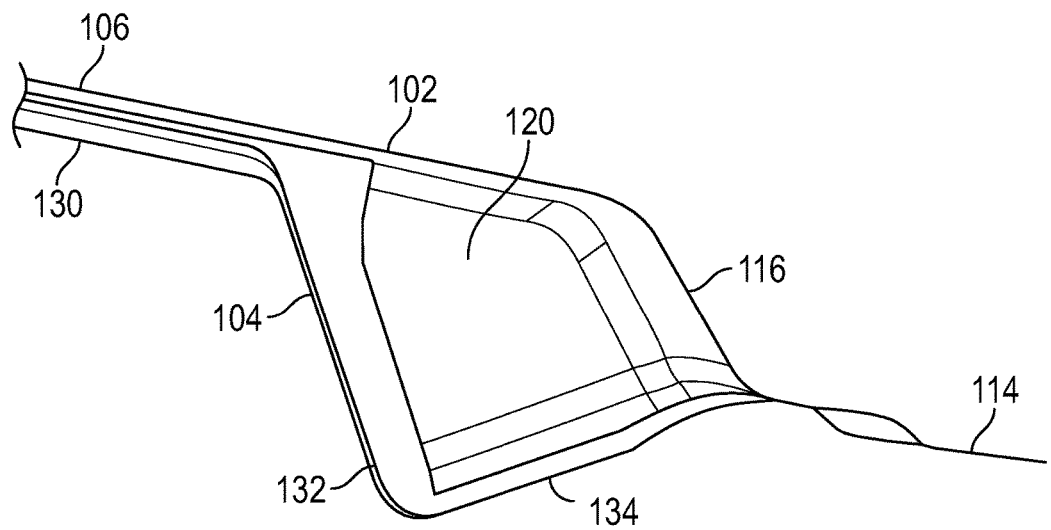
FIG. 7 is a schematic, cross-sectional view of the first body blocker and the second body blocker shown in FIG. 6, taken along section line 7-7.

Referring to the drawings, wherein like reference numbers correspond to like or similar components throughout the several figures, and beginning with FIGS. 1 and 2, a vehicle 10 includes a vehicle body 12, a frame 14 supporting the vehicle body 12, and a plurality of wheels 16 operatively coupled to the vehicle body 12. In the depicted embodiment, the vehicle 10 is a pickup truck. Each wheel 16 is coupled to a tire 18. In the depicted embodiment, the vehicle 10 includes two front wheels 16f and two rear wheels 16r. Although the drawings depict a truck, the vehicle 10 may be any suitable vehicle capable of transporting objects and/or people, such as boats, cars, airplanes, and farm equipment. The vehicle body 12 may be symmetrical along a vehicle central axis X and defines a passenger compartment 20. The passenger compartment 20 is located between the front bumper 26 and the rear bumper 28 of the vehicle body 12 and can accommodate objects and/or vehicle occupants. The vehicle body 12 further includes at least one rocker panel 30 between the wheel wheels, which are in turn disposed between the rear bumper 28 and the front bumper 26. In the present disclosure, the term "rocker panel" means the section of the vehicle body between the front and rear fenders and beneath the doors. In the depicted embodiment, the rocker panel 30 is disposed between the front fender 32 and the rear fender 34 and beneath the doors 36. The term "fender" means a covering over the wheels to prevent mud from splattering." The rocker panel 30 defines a first panel end 38 and a second panel end 40 opposite the first panel end 38. The second panel end 40 is spaced apart from the first panel end 38 along a longitudinal direction LD. The first panel end 38 may be referred to as the front panel end, and the second panel end 40 may be referred to a rear panel end 40. The longitudinal direction LD is parallel to the vehicle central axis X and is perpendicular to a vertical direction V. Thus, the rocker panel 30 extends (i.e., is elongated) along the longitudinal direction LD. The frame 14 is made of a substantially rigid material, such as a high strength material. In the present application, the term "frame" means bridge-like structural load-carrying members of a vehicle that support the engine and/or vehicle body and are in turn supported by the wheels of the vehicle. The frame 14 includes at least one frame rail 22 extending axially along the vehicle central axis X.

The vehicle 10 includes a tire blocker assembly 100 (FIG. 1) coupled to the vehicle body 12. The vehicle body 12 and the tire blocker assembly 100 collectively form a vehicle body assembly 101. As discussed in detail below, the tire blocker assembly 100 can manage and guide the wheel 16 (e.g., the front wheel 16f) the load path when the vehicle 10 is subjected to a frontal, laterally offset external force F. In the present disclosure, the term "front, laterally offset external force" means an external force applied to the front of the vehicle 10 at a location that is laterally offset from the vehicle central axis X by a lateral distance D (FIG. 2). Thus, the laterally, offset external force F is spaced apart from the vehicle central axis X along the lateral direction LT. The lateral direction LT is perpendicular to the longitudinal direction LD. The vehicle 10 can be subjected to the external force F, for example, when the front bumper 26 of the vehicle body 12 contacts a barrier B while the vehicle 10 is in motion. When the vehicle 10 contacts the barrier B, the tire blocker assembly 100 can guide the movement of the wheel 16 (e.g., the front wheel 16f) in order to prevent the wheel 16 from being displaced into the passenger compartment 20. In other words, the tire blocker assembly 100 can stop the inward displacement of the wheel 16 (e.g., the front wheel 16f) toward the passenger compartment 20, when the vehicle body 12 is subjected to the external force F, in order to prevent the wheel 16 from entering the passenger compartment 20. The tire blocker assembly 100 can be directly coupled to the vehicle body 12 at a location adjacent the wheel 16 (i.e., behind the front wheel 16f). As such, the wheel 16 can contact the tire blocker assembly 100 when the vehicle body 12 is subjected to the external force F, thereby enabling the tire blocker assembly 100 to direct the movement of the wheel 16 (e.g., the front wheel 16f).

With reference to FIGS. 3-11, the vehicle 10 further includes at least one control arm 42 directly interconnecting the wheel 16 (e.g., the front wheel 16f) and the frame 14. The vehicle 10 further includes a mount 44 directly coupled to the frame rail 22. The mount 44 can couple the frame 14 to the vehicle body 12. To this end, the mount 44 can be coupled to a boss 46 (FIG. 4), which couples the frame 14 to the vehicle body 12. In the depicted embodiment, the mount 44 protrudes directly from the frame rail 22 away from the vehicle central axis X (FIG. 2). As a non-limiting example, the mount 44 may be welded to the frame rail 22.

In addition to the mount 44, the vehicle 10 includes a shield 48 at least partially surrounding the mount 44 in order to protect the frame 14 from the external force F. The shield 48 is made of a substantially rigid material, such as steel, in order to absorb energy from the external force F. Therefore, the shield 48 can redirect the load path of the external force F when the vehicle body 12 is subjected to the external force F (FIG. 2). The shield 48 can be directly coupled to the frame rail 22. For instance, the shield 48 can be welded to the frame rail 22. In the depicted embodiment, the shield 48 is disposed between the wheel 16 and the mount 44. The shield 48 may partially surround the mount 44 in order to prevent the wheel 16 from moving toward the passenger compartment 20 (FIG. 1) when the external force F (FIG. 2) is applied to the vehicle body 12. It is envisioned that the shield 48 may be made as an integral one-piece structure. Regardless, the shield 48 includes a plurality of interconnected bar portions 50 that are angularly offset relative to one another in order to at least partially surround the mount 44. In the depicted embodiment, the shield 48 includes at least a first bar portion 50a and a second bar portion 50b directly coupled to the first bar portion 50a. The first bar portion 50a and the second bar portion 50b are obliquely angled to each other in order to surround the mount 44, thereby protecting the mount 44.

As discussed above, the vehicle 10 further includes the tire blocker assembly 100 for guiding the movement of the wheel 16 when the vehicle body 12 is subjected to the external force F. In particular, the tire blocker assembly 100 is configured, to guide the wheel 16 toward the shield 48 when the external force F is applied to the vehicle body 12 in order to prevent the wheel 16 from moving toward the passenger compartment 20 (FIG. 1). In the depicted embodiment, the tire blocker assembly 100 includes The tire blocker assembly 100 is coupled to the rocker panel 30 and includes a first blocker body 102 and a second blocker body 104 coupled to the first blocker body 102. In order to minimize part count, in a non-limiting example, the tire blocker assembly 100 may solely include the first blocker body 102, the second blocker body 104, and at least one fastener 112 for coupling the tire blocker assembly 100 to the vehicle body 12. The first blocker body 102 is farther from the first panel end 38 than the second blocker body 104 in order to guide the wheel 16 (e.g., front wheel 16f) away from the passenger compartment 20 (FIG. 1) when the external force F is applied to the vehicle body 12. The tire blocker assembly 100 is closer to the first panel end 38 than to the second panel end 40 (FIG. 1) in order to guide the wheel 16 (e.g., front wheel 16f) away from the passenger compartment 20 (FIG. 1) when the external force F is applied to the vehicle body 12. Each of the first blocker body 102 and the second body blocker are made of rigid (but different) materials. The first blocker body 102 comprises a first material, and the second blocker body 104 comprises a second material. The first material of the first blocker body 102 has a first yield strength, and the second material of the second body blocker has a second yield strength. The second yield strength of the second blocker body 104 is less than the first yield strength of the first blocker body 102 to allow the second blocker body 104 to absorb energy when the external force F is applied to the vehicle body 12. As a non-limiting example, the first material may be dual-phase steel that has ferrite and martensitic microstructure, and the second material may be a martensitic stainless steel with twelve percent chromium. Further, the first blocker body 102 has a maximum thickness (i.e., the first maximum thickness T1 (FIG. 8)), and the second blocker body 104 has a maximum thickness (i.e., the second maximum thickness (FIG. 8)). The first maximum thickness T1 of the first blocker body 102 is greater than the second maximum thickness T2 of the second blocker body 104 to allow the second blocker body 104 to absorb energy when the external force F is applied to the vehicle body 12. As a non-limiting example, the first maximum thickness T1 may be greater than 3.0 millimeters, and the second maximum thickness may be less than 2.4 millimeters.

As discussed above, the rocker panel 30 extends along the longitudinal direction LD. In other word, the rocker panel 30 is elongated along the longitudinal direction. The first blocker body 102 includes a deflecting wall 106 extending along a lateral direction LT. As discussed above, the lateral direction LT is perpendicular to the longitudinal direction LD. It is contemplated that the deflecting wall 106 may be obliquely angled relative to the longitudinal direction LD. The deflecting wall 106 may include ridges 108 to enhance the structural integrity of the tire blocker assembly 100.

Figure 8:
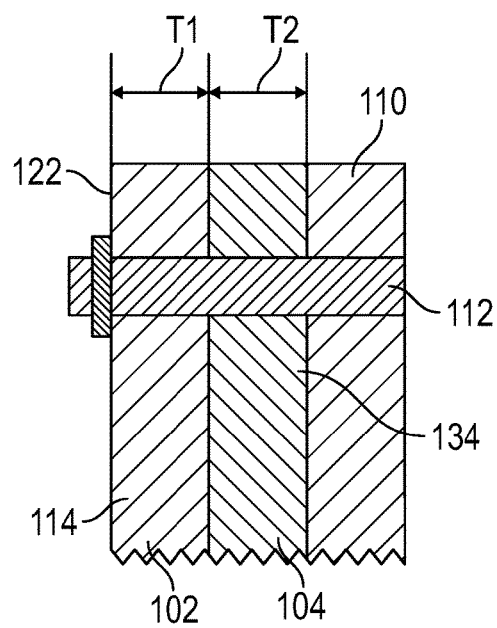
FIG. 8 is a schematic, cross-sectional view of the body-mounted tire blocker assembly shown in FIG. 5, taken along section line 8-8.

The vehicle body assembly 101 further includes a rocker end cap 110 directly coupled to the first panel end 38 of the rocker panel 30 to enhance the structural integrity of the vehicle body 12. The tire blocker assembly 100 is directly coupled to the rocker end cap 110 in order to enhance the structural integrity of the vehicle body assembly 101. As a non-limiting example, as shown in FIG. 8, the tire blocker assembly 100 further includes at least one fastener 112 extending through the first blocker body 102, the second blocker body 104, and the rocker end cap 110 to directly couple the tire blocker assembly 100 to the rocker end cap 110. Accordingly, the rocker end cap 110 is directly coupled to the second blocker body 104, and the second blocker body 104 is in direct contact with the rocker end cap 110 for facilitating the energy transfer through the tire blocker assembly 100 and the rocker end cap 110 when the external force F is applied to the vehicle body 12. In the depicted embodiment, the fastener 112 is a bolt. It is contemplated, however, that the fastener 112 may be a screw or another device capable of coupling the tire blocker assembly 100 to the rocker end cap 110.

The deflecting wall 106 of the first blocker body 102 is positioned relative to the shield 48 such that the deflecting wall 106 guides the wheel 16 toward the shield 48 when the external force F is applied to the vehicle body 12. In particular, the deflecting wall 106 is configured, shaped, and sized to extend along the entire length GL of the gap G extending from the vehicle body 12 to the shield 48. Such size, configuration, and shape allows the deflecting wall 106 of the first blocker body 102 to guide the movement of the wheel 16 directly toward the shield 48, thereby preventing the wheel 16 from moving toward the passenger compartment 20 (FIG. 1).

Figure 9:
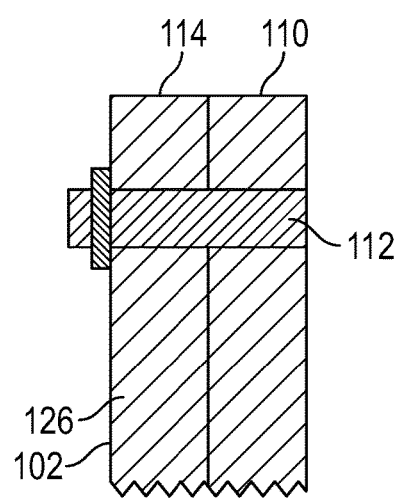
FIG. 9 is a schematic, cross-sectional view of the body-mounted tire blocker assembly shown in FIG. 5, taken along section line 9-9.
Figure 10:
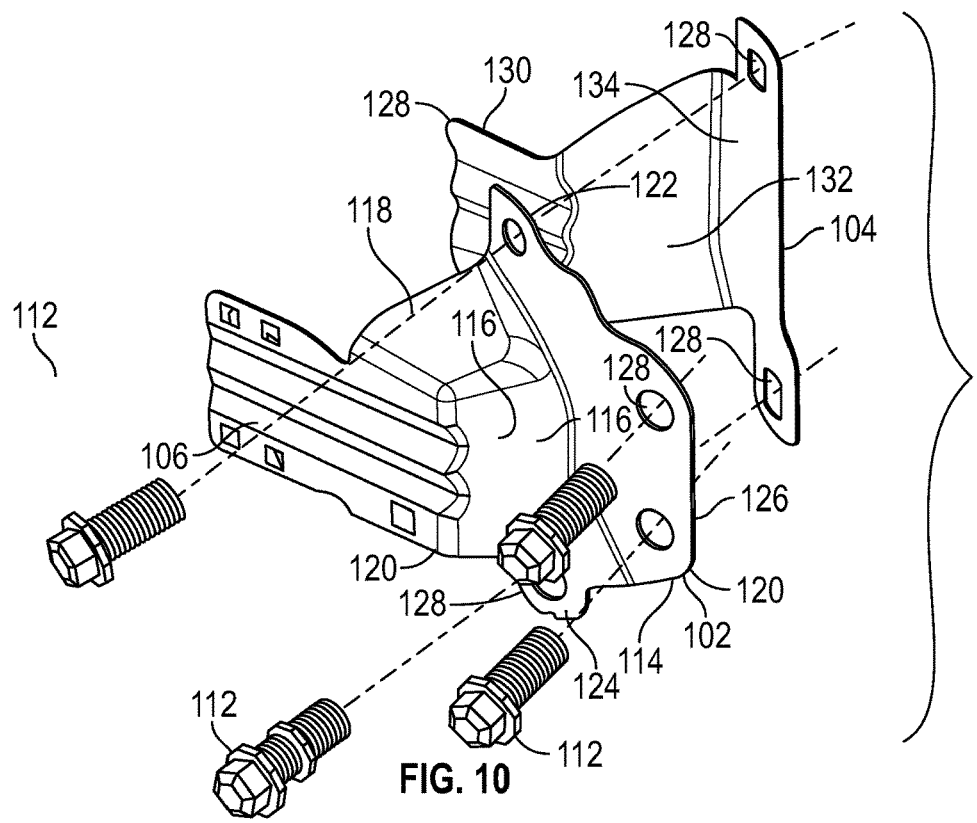
FIG. 10 is a schematic, exploded, perspective view of the body-mounted tire blocker assembly shown in FIG. 3.
Figure 11:
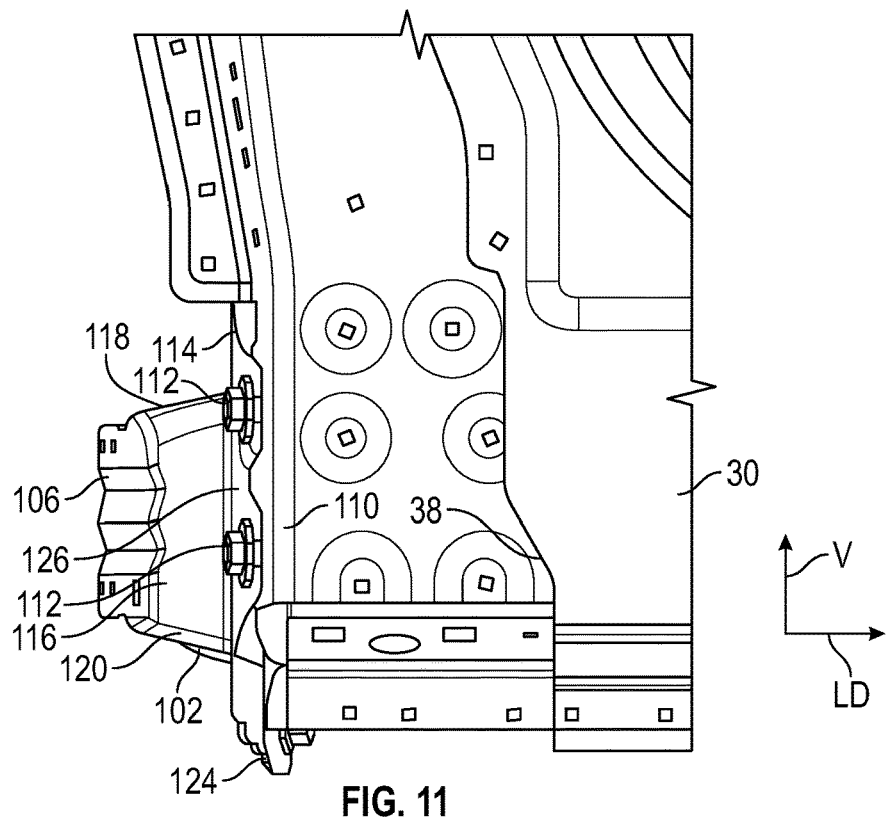
FIG. 11 is a schematic, side view of the vehicle body assembly, depicting the body-mounted tire blocker assembly coupled to the vehicle body.

Aside from the deflecting wall 106, the first blocker body 102 includes a first flange 114 coupled to the deflecting wall 106. The first flange 114 is closer to the rocker end cap 110 than to the deflecting wall 106 to facilitate energy transfer from the tire blocker assembly 100 to the rocker end cap 110 when the external force F is applied to the vehicle body 12. As shown in FIG. 9, at least one of the fastener 112 (e.g., bolt) extends through the first flange 114 and the rocker end cap 110. Thus, the first flange 114 of the first blocker body 102 may be directly coupled to the rocker end cap 110 to facilitate energy transfer from the tire blocker assembly 100 to the rocker end cap 110 when the external force F is applied to the vehicle body 12. As such, the first flange 114 (and therefore the first blocker body 102) may be in direct contact with the rocker end cap 110 to facilitate energy transfer from the tire blocker assembly 100 to the rocker end cap 110 when the external force F is applied to the vehicle body 12.

The first blocker body 102 includes a first connecting wall 116 connected to the first flange 114. The first connecting wall 116 is directly coupled to (and obliquely angled relative to) the first flange 114 to facilitate energy transfer from the tire blocker assembly 100 to the rocker end cap 110 when the external force F is applied to the vehicle body 12. Further, the first connecting wall 116 is directly coupled to the deflecting wall 106 to facilitate energy transfer from the tire blocker assembly 100 to the rocker end cap 110 when the external force F is applied to the vehicle body 12.

The first blocker body 102 further includes an upper coupling wall 118 and a lower coupling wall 120. The upper coupling wall 118 is spaced apart from the lower coupling wall along the vertical direction V. The vertical direction V is perpendicular to the longitudinal direction LD. The upper coupling wall 118 is directly coupled to the first flange 114. The lower coupling wall 120 is directly coupled to the first flange 114. The upper coupling wall 118 and the lower coupling wall 120 are parallel to each other. Each of the upper coupling wall 118 and the lower coupling wall 120 is obliquely angled to the deflecting wall 106. Moreover, each of the upper coupling wall 118 and the lower coupling wall 120 is directly coupled to the deflecting wall 106. All the features of the upper coupling wall 118 and the lower coupling wall 120 (along with the structural relationships with other components) described in this paragraph may facilitate energy transfer from the tire blocker assembly 100 to the rocker end cap 110 when the external force F is applied to the vehicle body 12. In order to minimize part count, in a non-limiting example, the first blocker body 102 may solely include the deflecting wall 106, the upper coupling wall 118, the lower coupling wall 120, and the first flange 114, the first connecting wall 116, and the first flange 114.

The first flange 114 of the first blocker body 102 includes a first flange portion 122, a second flange portion 124, and a third flange portion 126 directly interconnecting the first flange portion 122 and the second flange portion 124. Each of the first flange portion 122, the second flange portion 124, and the third flange portion 126 has one or more holes 128 configured, shaped, and sized to receive at least one fastener 112. The third flange portion 126 is in direct contact with the rocker end cap 110. One or more fasteners 112 can extend through the holes 128 to directly couple the third flange portion 126 to the rocker end cap 110. The first flange portion 122 and the second flange portion 124 are in direct contact with the second blocker body 104. One or more fasteners 112 extends through the holes 128 to directly couple the first flange portion 122 and the second flange portion 124 to the second blocker body 104. The first flange portion 122 is spaced apart from the second flange portion 124 along the vertical direction V. All the features of the first flange 114 described in this paragraph may enhance the structural integrity of the first blocker body 102.

The second blocker body 104 includes an energy-absorbing wall 130 extending along the lateral direction LT. The energy-absorbing wall 130 is parallel to the deflecting wall 106. In addition, the second blocker body 104 includes a second connecting wall 132 directly coupled to the energy-absorbing wall 130. The second connecting wall 132 is obliquely angled relative to the energy-absorbing wall 130. The second connecting wall 132 is parallel to the first connecting wall 116. The second connecting wall 132 is closer to the rocker end cap 110 than the energy-absorbing wall 130. The second blocker body 104 further includes a second flange 134. The second flange 134 is directly coupled to the second connecting wall 132. Accordingly, the second connecting wall 132 directly interconnects the second flange 134 and the energy-absorbing wall 130. The second flange 134 is disposed between the rocker end cap 110 and the first flange 114. Moreover, the second flange 134 may have one or more holes 128 each configured, shaped, and sized to at least one of the fasteners 112. For instance, as shown in FIG. 8, one of the fasteners 112 may extend through the first flange 114 of the first blocker body 102, the second flange 134 of the second blocker body 104, and the rocker end cap 110, thereby coupling the tire blocker assembly 100 to the vehicle body 12. In order to minimize part count, in a non-limiting example, the second blocker body 104 may solely include the energy-absorbing wall 130, the second connecting wall 132, and the second flange 134. All the features of the second blocker body 104 described in this paragraph facilitate energy absorption and/or management by the tire blocker assembly 100 when the external force F is applied to the vehicle body 12.

Figure 12:
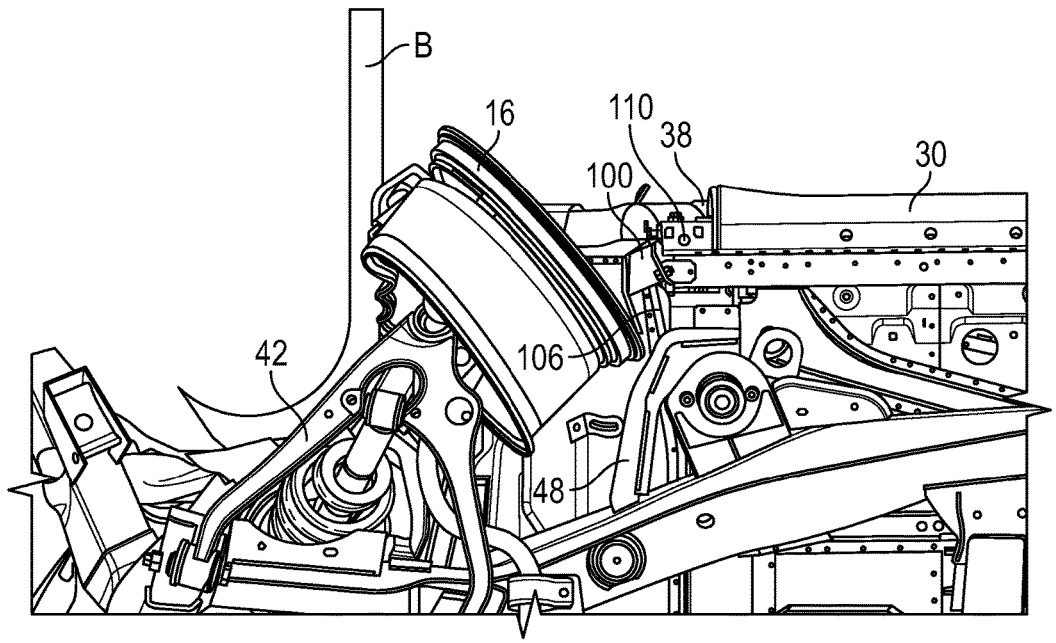
FIG. 12 is a schematic, fragmentary, bottom view of the vehicle shown in FIG. 1, depicting the body-mounted tire blocker assembly guiding the wheel toward the shield after the vehicle has been subjected to an external force.
Figure 13:
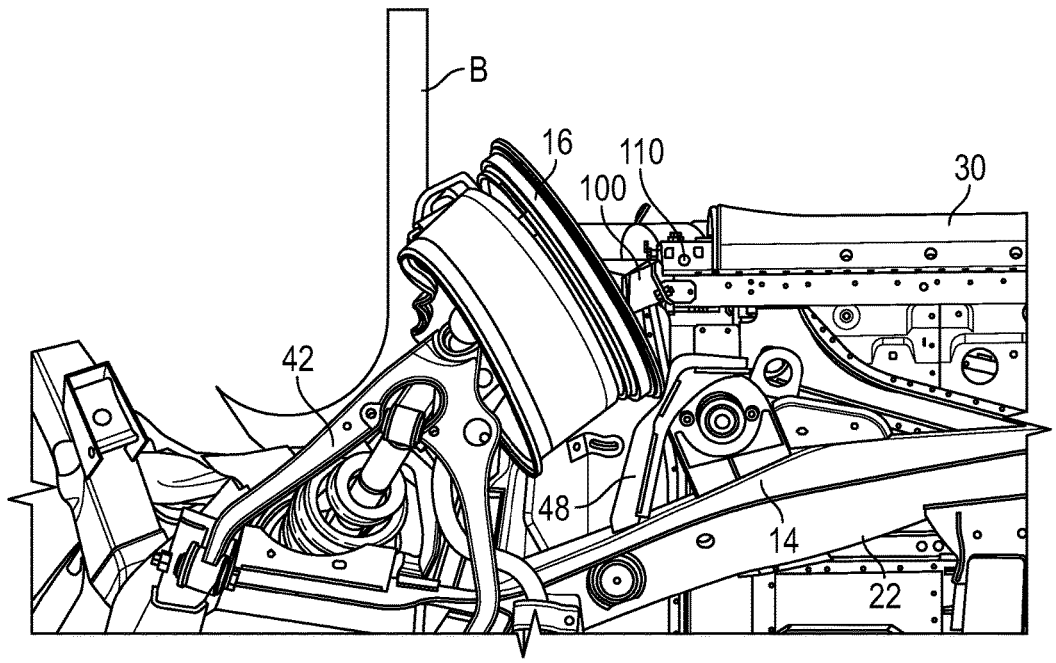
FIG. 13 is a schematic, fragmentary, bottom view of the vehicle shown in FIG. 1, depicting the wheel in contact with the shield after the vehicle has been subjected to an external force.
Figure 14:
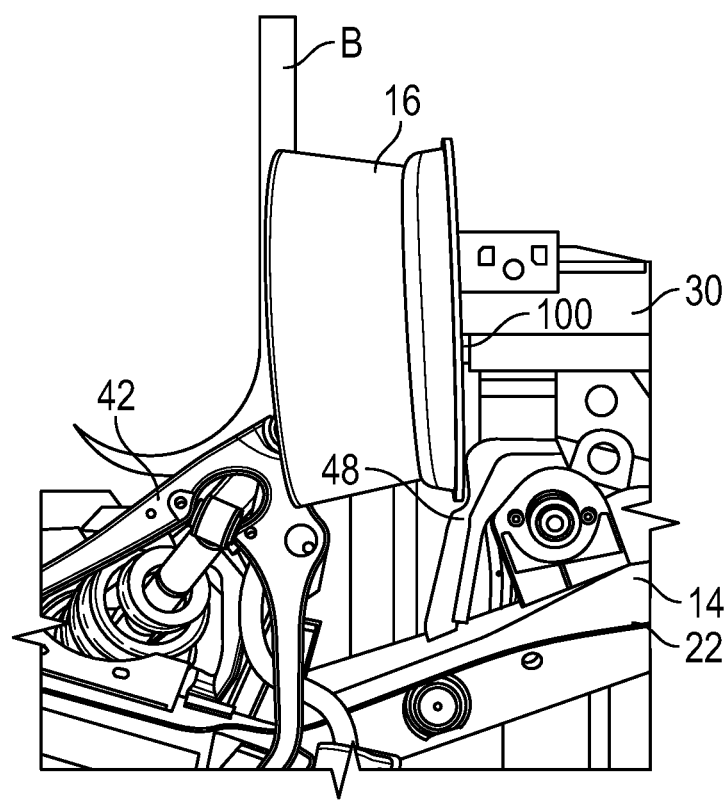
FIG. 14 is a schematic, fragmentary, bottom view of the vehicle shown in FIG. 1, depicting the body-mounted tire blocker in a collapsed configuration after the vehicle has been subjected to an external force and the wheel has been in contact with the shield.

Referring to FIGS. 12-14, when the external force F is applied to the vehicle body 12 (such as when the vehicle body 12 contacts the barrier B), the wheel 16 (i.e., the front wheel 16f) tends to move inwardly toward the passenger compartment 20. To inhibit this inward movement of the wheel 16, the tire blocker assembly 100 redirects the motion of the wheel 16 toward the shield the frame rail 22 and away from the passenger compartment 20. Specifically, when the external force F is applied to the vehicle body 12, the wheel 16 moves toward the deflecting wall 106 of the tire blocker assembly 100. Once the wheel 16 contacts the tire blocker assembly 100, the deflecting wall 106 redirects the movement of the wheel 16 toward the shield 48 as shown in FIGS. 12 and 13. Eventually, continued motion of the wheel 16 toward the shield 48 may cause the tire blocker assembly 100 to collapse as shown in FIG. 14. At this juncture, the energy-absorbing wall 130 assists in absorbing energy from the external force F in order to slow the movement of the wheel 16. At this point, the shield 48 prevents the wheel 16 from moving further toward the passenger compartment 20 (FIG. 1).

While the best modes for carrying out the teachings have been described in detail, those familiar with the art to which this disclosure relates will recognize various alternative designs and embodiments for practicing the teachings within the scope of the appended claims. The vehicle 10 and the tire blocker assembly 100 illustratively disclosed herein may be suitably practiced in the absence of any element which is not specifically disclosed herein. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings.

The invention claimed is:

1. A vehicle body assembly, comprising:
a vehicle body defining a passenger compartment, wherein the vehicle body includes a rocker panel, the rocker panel defines a first panel end and a second panel end opposite the first panel end; and
a tire blocker assembly coupled to the rocker panel, wherein the tire blocker assembly includes a first blocker body and a second blocker body coupled to the first blocker body, and the first blocker body is farther from the first panel end than the second blocker body in order to guide a wheel away from the passenger compartment when an external force is applied to the vehicle body;
wherein the first blocker body comprises a first material, the second blocker body comprises a second material, the first material has a first yield strength, the second material has a second yield strength, the second yield strength is less than the first yield strength to allow the second blocker body to absorb energy when the external force is applied to the vehicle body; and
wherein the rocker panel extends along a longitudinal direction, and the first blocker body includes a deflecting wall extending along a lateral direction, and the lateral direction is perpendicular to the longitudinal direction.

2. The vehicle body assembly of claim 1, wherein the first blocker body has a first maximum thickness, the second block body has a second maximum thickness, and the first maximum thickness is greater than the second maximum thickness.

3. The vehicle body assembly of claim 2, wherein the first panel end is spaced apart from the second panel end along the longitudinal direction, and the tire blocker assembly is closer to the first panel end than to the second panel end.

4. The vehicle body assembly of claim 3, further comprising a rocker end cap directly coupled to the first panel end, and the tire blocker assembly is directly coupled to the rocker end cap.

5. The vehicle body assembly of claim 4, wherein the first blocker body includes a first flange coupled to the deflecting wall, the first flange is closer to the rocker end cap than to the deflecting wall, and the vehicle body assembly further includes at least one fastener extending through the first flange and the rocker end cap.

6. The vehicle body assembly of claim 5, wherein the first blocker body includes an upper coupling wall interconnecting the deflecting wall and the first flange.

7. The vehicle body assembly of claim 6, wherein the second blocker body includes an energy-absorbing wall extending along the lateral direction.

8. The vehicle body assembly of claim 7, wherein the first blocker body includes a first connecting wall directly interconnecting the first flange and the deflecting wall, the second blocker body includes a second connecting wall, the second connecting wall is closer to the rocker end cap than the energy-absorbing wall, and the second connecting wall is obliquely angled relative to the energy-absorbing wall.

9. The vehicle body assembly of claim 8, wherein the second blocker body includes a second flange, the second connecting wall directly interconnecting the energy-absorbing wall and the second flange, the second connecting wall is parallel to the first connecting wall, and the deflecting wall is parallel to the energy-absorbing wall.

10. A vehicle, comprising:
a vehicle body defining a passenger compartment, wherein the vehicle body includes a rocker panel, and the rocker panel defines a first panel end and a second panel end opposite the first panel end;
a frame supporting the vehicle body, wherein the frame includes frame rail;
a mount directly coupled to the frame rail;
a wheel coupled to the frame; and
a tire blocker assembly coupled to the rocker panel, wherein the tire blocker assembly includes a first blocker body and a second blocker body coupled to the first blocker body, and the first blocker body is farther from the first panel end than the second blocker body in order to guide the wheel away from the passenger compartment when an external force is applied to the vehicle body; and
a shield directly coupled to the frame rail, wherein the shield is disposed between the wheel and the mount, and the shield partially surrounds the mount in order to prevent the wheel from moving toward the passenger compartment when an external force is applied to the vehicle body.

11. The vehicle of claim 10, wherein the shield includes a first bar portion and a second bar portion directly connected to the first bar portion, and the first bar portion and the second bar portion are obliquely angled relative to each other.

12. The vehicle of claim 11, wherein the rocker panel extends along a longitudinal direction, the first blocker body includes a deflecting wall extending along a lateral direction, the lateral direction is perpendicular to the longitudinal direction, and the deflecting wall is positioned relative to the shield such that the deflecting wall guides the wheel toward the shield when the external force is applied to the vehicle body.

13. The vehicle of claim 12, wherein the first blocker body comprises a first material, the second blocker body comprises a second material, the first material has a first yield strength, the second material has a second yield strength, the second yield strength is less than the first yield strength to allow the second blocker body to absorb energy when the external force is applied to the vehicle body.

14. The vehicle of claim 13, the rocker panel extends along the longitudinal direction, the first panel end is spaced from the second panel end along the longitudinal direction, the vehicle body further includes a rocker end cap directly coupled to the first panel end, and the tire blocker assembly is directly coupled to the rocker end cap, and the tire blocker assembly further includes a fastener extending through the first blocker body, the second blocker body, and the rocker end cap to directly couple the tire blocker assembly to the rocker end cap.

15. The vehicle of claim 14, wherein the first blocker body has a first maximum thickness, the second block body has a second maximum thickness, and the first maximum thickness is greater than the second maximum thickness.

* * * * *